US012286337B2

(12) United States Patent
Neubauer

(10) Patent No.: US 12,286,337 B2
(45) Date of Patent: Apr. 29, 2025

(54) APPARATUS AND METHOD FOR FILLING CONTAINERS

(71) Applicant: KRONES AG, Neutraubling (DE)

(72) Inventor: Michael Neubauer, Grassau (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/008,645

(22) PCT Filed: Jun. 16, 2021

(86) PCT No.: PCT/EP2021/066315
§ 371 (c)(1),
(2) Date: Dec. 6, 2022

(87) PCT Pub. No.: WO2021/255130
PCT Pub. Date: Dec. 23, 2021

(65) Prior Publication Data
US 2023/0219802 A1 Jul. 13, 2023

(30) Foreign Application Priority Data
Jun. 19, 2020 (DE) ..................... 10 2020 116 266.9

(51) Int. Cl.
*B67D 1/08* (2006.01)
*B67D 3/00* (2006.01)

(52) U.S. Cl.
CPC ........... *B67D 1/0894* (2013.01); *B67D 3/009* (2013.01); *B67D 2210/00073* (2013.01)

(58) Field of Classification Search
CPC .......... B67D 2210/00073; B67D 3/009; B67D 1/0894; B67D 1/0888
See application file for complete search history.

(56) References Cited

U.S. PATENT DOCUMENTS 7,571,586 B1 8/2009 Morales
10,500,782 B2 12/2019 Desoutter et al.
(Continued)

FOREIGN PATENT DOCUMENTS

DE 3603532 8/1987 ............... B67D 5/02
DE 4315422 11/1994 ............... B67D 5/01
DE 19702770 7/1998 ............. B65G 47/29
(Continued)

OTHER PUBLICATIONS

German Search Report issued in German application No. 10 2020 116 266.9, with machine translation, dated Feb. 27, 2021, 10 pgs.
(Continued)

*Primary Examiner* — Paul J Gray
(74) *Attorney, Agent, or Firm* — HAYES SOLOWAY P.C.

(57) ABSTRACT

An apparatus for filling containers with a carrier on which a container to be filled can be placed and fixed, wherein the support is pivotable with respect to a pivot axis which extends at an angle other than 0° with respect to a longitudinal direction of the container to be filled, with a first filling device, in order to fill the container in a first pivoted position of the container with respect to the pivot axis via its mouth, and having a rinsing device in order to rinse the container in a second pivot position of the container with respect to the pivot axis through its mouth, in particular with a liquid.

13 Claims, 2 Drawing Sheets

(56) References Cited

U.S. PATENT DOCUMENTS

| | | | | |
|---|---|---|---|---|
| 2009/0159154 | A1 | 6/2009 | Buchstab et al. | |
| 2019/0077649 | A1* | 3/2019 | Heindl | B67D 1/07 |

FOREIGN PATENT DOCUMENTS

| | | | |
|---|---|---|---|
| DE | 102019114338 | 12/2020 | B67D 7/00 |
| EP | 0291674 | 7/1986 | B67C 1/16 |
| EP | 0424682 | 9/1990 | B67D 1/06 |
| EP | 2399681 | 6/2010 | B08B 9/30 |
| JP | 2003175997 | 6/2003 | B67C 3/02 |

OTHER PUBLICATIONS

International Search Report and Written Opinion issued in PCT/EP2021/066315, with translation, dated Sep. 23, 2021, 24 pgs.

* cited by examiner

APPARATUS AND METHOD FOR FILLING CONTAINERS

The present invention relates to an apparatus for filling containers and, in particular, to such an apparatus from which the containers to be filled can be fed by a user and/or manually and from which the filled containers can also be removed again (in particular by a user). The apparatus described below is a so-called beverage dispenser with which an end customer can fill his container. Such beverage dispensers are found, for example, in universities, railway stations and the like. It is known in the prior art that disposable containers, such as plastic cups, are used, which are then filled with the beverage. However, there is also a need to use reusable containers.

The present invention is therefore based on the object of providing a filling device for filling also reusable containers, which also enables reliable and clean filling of the containers. According to the invention, this is achieved by the subject matter of the independent claim.

Advantageous embodiments and further developments are the subject of the subclaims.

An apparatus for filling containers according to the invention has a carrier on which a container to be filled can be placed and fixed, wherein this carrier being pivotable with respect to a pivot axis and/or rotatable with respect to an axis of rotation, wherein this pivot axis extending at an angle different than 0° with respect to a longitudinal direction of the container to be filled. Furthermore, the apparatus has a first filling device for filling the container in a first pivot of position of the container with respect to said pivot axis via its mouth.

Preferably, the apparatus has a rinsing device for rinsing the container through its mouth, in particular with a liquid, in a second pivot position of the container with respect to the pivot axis.

Preferably, the apparatus has a further application device which is suitable and intended for introducing a further liquid into the container, wherein therefore, in particular the container, can be pivoted into a further pivoted position. This further liquid can be, for example, a further liquid to be filled, but also a rinsing liquid for rinsing the container.

Therefore, an apparatus is preferably proposed which enables rinsing and subsequent filling of the container. To achieve this object, a structure is proposed in which a rotatable or pivotable carrier and/or plate is provided on which the consumer places the container to be filled. Preferably, said pivot axis is arranged or configured such that the mouth of the container extends around it. It is possible that a distance between the mouth of the container and the pivot axis remains constant and that the mouth therefore runs around the pivot axis on a certain radius or at a certain distance.

In a preferred embodiment, the filling device comprises one or more filling valves. It is possible that the filling device is suitable and intended for filling a single-component beverage, for example water, but it would also be possible for the filling device to fill multi-component beverages.

In a preferred embodiment, the apparatus comprises a collecting device and/or a collecting container to collect liquid. In particular, this can be rinsing liquid with which the container is rinsed.

Furthermore, it is also possible that residues of any liquid that may still be present in the containers are collected by this collecting container. This means that this collecting container is preferably also located at least below the pivot axis with respect to which the container is pivoted.

In a further preferred embodiment, the pivot axis runs perpendicular to the longitudinal direction of the container. Preferably, this pivot axis and/or rotation axis is aligned horizontally or approximately horizontally. Preferably, therefore, the container is pivoted in a vertically extending plane.

For flushing or rinsing the container in this design, only a rotation of the container by a predetermined angle, for example by 180°, is required, f or example in such a way that its mouth projects vertically downwards and thus rinsing is possible from below.

Particularly preferably, this rinsing device is designed in such a way that a rinsing medium reaches all areas of the container, in particular also a bottom area of the container.

Furthermore, it is also possible that the rinsing device is designed in the form of a rinsing lance which can enter the interior of the container.

For rinsing, the container can be moved and/or pivoted downwards over the rinsing device, for example a rinsing nozzle.

In addition, it would also be possible for this rinsing device not to be arranged in a 6 o'clock position, as in one embodiment, but offset at an angle to it, for example in the 5 o'clock position. Preferably, however, the position for rinsing is at 4 o'clock (or at 8 o'clock), for example, in order to prevent the contaminated rinsing water running out of the bottle from contaminating the rinsing nozzle. It would also be conceivable to fill the rinsing liquid into the container e.g. at "1 o'clock" and then to pivot the container downwards to remove the rinsing liquid from the container. This also avoids contamination of the rinsing nozzle.

If a user places a non-empty container in the apparatus, the medium in the container would run over the rinsing nozzle or the rinsing device when it is pivoted downwards. This could contaminate the rinsing device, which could lead to contamination of the next containers. To prevent this, the rinsing nozzle could also be arranged in a different position so that the liquid first runs out of the container and then a rinsing process takes place.

However, it would also be possible for a control to cause the container to first be pivoted into another position, for example a 7 o'clock position or a 5 o'clock position, in which position residual liquid can run out of the container and only then the container is moved over the rinsing device. With this variant, the liquid would run out of the inclined container and rinsing could take place afterwards. With the variant described above, the liquid would run vertically downwards from the container and the rinsing device located diagonally next to it would not be touched by the liquid.

In a further preferred embodiment, the apparatus has a cleaning device for cleaning the rinsing device. For example, it would be possible for the rinsing device itself to be cleaned after each rinsing process.

During a filling process, it would be possible for the container to remain in the rinsing position for a predetermined period of time, even after the rinsing device has been deactivated. In this way, it can be achieved that the rinsing medium can drip out. Subsequently, the carrier or the plate can move into a further rotational position in order to bring the mouth of the container into a position suitable for filling it through a suitably placed filling valve.

In a particularly preferred embodiment, the filling device has a filling valve in the form of a free-flow valve which simply allows the filling medium to run into the container and/or a counter-pressure valve which presses on the mouth, pretensions the container and then fills it.

Especially in the case of free-jet filling of CSD, an inclined position of the container during filling is advantageous, as foaming is minimised.

In a further advantageous embodiment, the apparatus has a closure device which closes the filled container with a closure. This can also be a closure supplied by the user, but it would also be possible for the closures to be taken from a store in order to close the container.

In a further advantageous embodiment, a fixing device is arranged on a carrier for fixing the container to the holding device or the carrier. In order to fully utilise the potential of the apparatus described here, the type of container to be filled is important. In particular, in order to be able to carry out the rinsing process, the container should be fixed in some way to the rotatable carrier or plate. This can be done, for example, by an active or passive clamp into which the user inserts and/or clips the container. Preferably, this fixing device is designed in such a way that it can at least hold the weight force of the container.

In a further advantageous embodiment, the fixing device comprises fixing means selected from a group of fixing means including vacuum fixing means, magnetic fixing means, gripping elements, mechanical elements, combinations thereof and the like. This fixing device can also prevent the container from moving sideways in relation to the carrier.

For example, in addition to the clamps described above, a vacuum could also be used to hold the container to the carrier. Alternatively, a mechanism that can fix the container by means of a force or form fit could also be considered. For example, the container can be designed in such a way that it can be gripped behind by a fixing means.

Furthermore, it would also be possible for the container to be attached or fixed to a plate or carrier by means of magnetic forces. This can be done, for example, by inserting a piece of a ferromagnetic steel into a double-walled stainless steel bottle as described in more detail below. Besides or in addition to this, it would also be conceivable to integrate a piece of a ferromagnetic material in another way into the bottom of a container to be filled. This can be done, for example, by gluing a steel plate to the bottom of a glass bottle or a plastic bottle. Alternatively, it would be possible for the container itself to be made wholly or partly of a ferromagnetic material.

Such a container has further advantages, it can also be held securely in position in the car by means of a magnetic plate, for example.

In a further preferred embodiment, the container also has second fixing means for fixing the container to the carrier. These fixing means can be, for example, the magnetic plate described here, but also engagement possibilities in which, for example, a projection of a gripper arm or a gripper clamp can engage.

In a further advantageous embodiment, the first filling device is arranged in such a way that the container is filled in a pivot position by this first filling device, which deviates from a vertical orientation of the container. This means that the container is not filled in an exactly upright state, but in a pivoted position that deviates from this. As mentioned above, this can be advantageous for certain filling mechanisms.

Advantageously, the container is not filled exactly upright, but at an angle to the vertical position which is greater than 5°, preferably greater than 10°, particularly preferably greater than 15°.

In a preferred embodiment, the rinsing device is arranged in such a way that the container can be rinsed by this rinsing device in a pivot position that also deviates from a vertical orientation of the container. As described above, this prevents the rinsing device from becoming soiled by leaking liquid.

In a preferred embodiment, the above-mentioned collecting container for collecting liquid can be emptied. For example, a collecting container can be provided which can be removed from the apparatus in order to carry out the emptying.

In a further advantageous embodiment, the apparatus comprises a second filling device for filling the container in a second pivot position of the container with respect to the pivot axis via its mouth.

Preferably, the first filling device and the second filling device are arranged in different pivot positions. In this way, it is possible that the container can be filled with two different liquids or beverages, for example. It is also possible that the first and the second filling device serve to fill the container with different components.

In a further advantageous embodiment, the apparatus has an operating device with which a user can, for example, select a beverage to be filled. Accordingly, a display is also preferably provided by means of which the user can check a filling process or receive confirmation of a selected beverage.

In addition, the apparatus may also have a coin and/or credit card acceptance mechanism that allows the user to pay for a drink.

In a further advantageous embodiment, the apparatus comprises an inspection device for inspecting the container. Preferably, the inspection device is suitable and intended for inspecting an interior of the container. Preferably, the inspection device comprises an image recording device, such as in particular but not exclusively a camera.

It is possible that this inspection device, for example a camera, is fixed. This inspection device serves in particular, but not exclusively, to check the interior of the containers for soiling or foreign matter.

In a further preferred embodiment, the apparatus comprises a drive device for rotating (with respect to the pivot axis) the above-mentioned carrier on which the container is arranged. Preferably, a control device for controlling the drive device is further provided.

In a preferred embodiment, a rotational movement of the carrier can be controlled by the camera taking into account one or more image recordings, in particular in such a way that the image recording device can record one or more image recordings of the container from different directions.

For example, a rotation of the bottle plate or carrier can thus be used to support the inspection. For example, the bottle plate, in particular with the container fixed to it, can perform a short right-left movement in order to cause any beverage residue in the bottle to slosh. This makes it much easier to detect transparent beverage residues, e.g. lemonade.

Preferably, the carrier has a first arrangement area for arranging the container and a second arrangement area and the container can be arranged either at the first arrangement area or at the second arrangement area.

These arrangement areas can be adapted to different containers, for example containers with different cross-sections or container heights.

Particularly preferably, the first arrangement area is formed at a first distance from the pivot axis and the second arrangement area is formed at a second distance from the pivot axis and these distances are different. In this way, for example, the first arrangement area can be used to arrange taller containers and the second arrangement area can be used to arrange less tall containers. If two or more bottle heights are to be filled in the machine, the carrier or plate can have several docking positions for the containers. This or these arrangement areas can again have the above-mentioned fixing devices.

Additionally or alternatively, it would also be conceivable that the filling device(s) and/or the filling valves (and possibly the rinsing nozzle) are designed to be movable. These can then be ideally positioned to the respective bottle height.

The containers do not necessarily have to be filled to 100%. The user can tell the machine (e.g. via smartphone, voice input, and/or touchscreen, etc.) that his container should only be partially filled (e.g. “Fill 300 ml into a 500 ml container”). The filling can also be made dependent on a payment, for example.

In a further preferred embodiment, a filling speed at which the filling device fills the container is variable and/or adjustable. For example, in order to keep the CO2 loss during filling as low as possible, the carbonated beverage (CSD) is preferably filled slowly into the container. A filling speed of less than 100 ml/s is advantageous here, a speed of less than 50 ml/s is particularly advantageous, and a speed of less than 25 ml/s is even better. This corresponds to 20 s for filling a 500 ml bottle.

The present invention is further directed to a method for filling containers, wherein a container to be filled is first fixed to a carrier. Then, preferably, the carrier with the container fixed thereto is pivoted into a rinsing position in which the container can be rinsed. Preferably, the container is rinsed through the mouth by means of a rinsing liquid. This rinsing liquid can also be water, for example.

In a further method step, the carrier with the container fixed to it is pivoted into a filling position and the container is filled with a liquid through its mouth in a further method step.

In a further preferred method, the container first pivots into an emptying position, which serves in particular to empty liquid located in the container.

In a preferred embodiment, the apparatus has a measuring device to determine a quantity of the beverage or liquid to be filled into the container. This can be a flow measuring device, but it would also be possible to use a weight measuring device. Alternatively, the fill level of the container can also be determined by measuring the torque generated by the container being filled with respect to the axis of rotation of the carrier.

Preferably, the containers to be filled are standard containers that are standardised for this method or the apparatus described here. In particular, a predetermined area of the containers can be adapted to the fixing device.

In a further advantageous embodiment, the pivot axis with respect to which the container is pivoted is arranged below the container (with the container standing upright). However, it is also conceivable that the fixing device is designed in such a way that the geometric pivot axis runs through the container.

In a further method, a customer first places a container to be filled on the plate or carrier. Any protective device, such as a protective cover, can be closed. Preferably, an electromagnet or other gripping means in the carrier is activated and fixes the container on the carrier.

In a further step, the carrier pivots the container with its mouth over the rinsing device. In this position, the rinsing process can start.

After the rinsing process has been completed, the carrier pivots the container mouth under a filling valve or under a filling device. The customer can select the desired beverage, for example, via a display, an app or voice input. The filling process starts.

After filling is complete, the carrier pivots back into the starting position. The fixing device, for example the electromagnet, is deactivated, an optionally available protective device can be opened and the filled container can be removed.

Thus, the invention is characterised by the fact that with a single movement, namely a rotation, the filling process can be carried out in several treatment steps, in particular including a rinsing process. Each treatment can be placed in the most favourable position around the carrier. This means, for example, a rinsing nozzle at the bottom and the filling valves at the side or top. The container is fixed on the rotating part.

A suitable container, which preferably consists at least in part of a ferromagnetic material, is preferably held in position during treatment by means of magnetic forces.

Further advantages and embodiments can be seen in the attached drawings.

Figure 1:
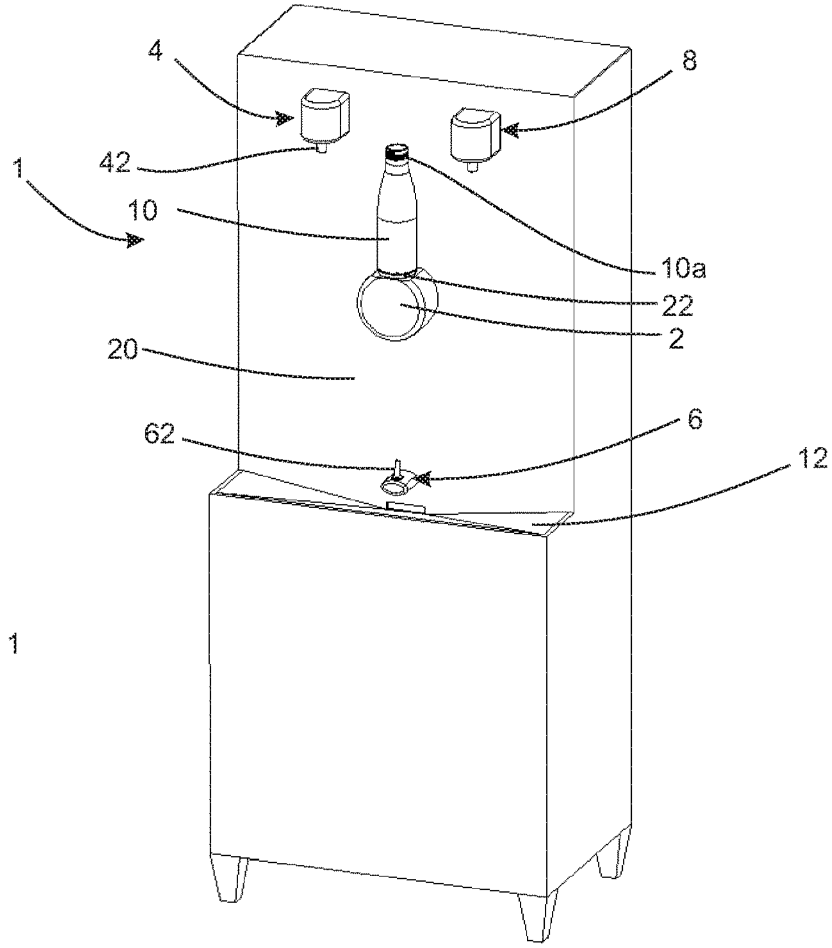
FIG. 1 shows an illustration of an apparatus according to the invention.

FIG. 1 shows a representation of an apparatus 1 according to the invention for filling containers 10. This has a carrier which can be pivoted and/or rotated about a pivot axis S. This carrier has a fixing device, not shown in detail, for fixing a container 10. This carrier has a fixing device, not shown in detail, for fixing a container 10. The container 10 has a mouth **10*a*** through which it can be filled and rinsed.

The reference sign 4 indicates a first filling device which can fill the container in a certain position. The reference sign 42 indicates a filling valve of this filling device 4. The reference sign 8 indicates a second filling device, which can also have a filling valve here. The reference sign 20 indicates a housing or a carrier on which the filling devices 4 and 8 as well as the carrier 2 are arranged.

The reference sign 6 indicates a rinsing device for rinsing the containers. The reference sign 62 indicates a rinsing valve or a rinsing lance which can allow a rinsing liquid to flow into the interior of the container. It would be possible for this rinsing lance to be extendable in order to be able to enter the interior of the container. It is also conceivable that the container is not only pivotable but also linearly displaceable in order to move a corresponding rinsing lance into the container.

The reference sign 12 indicates a collecting container for collecting rinsing liquid and, if necessary, also for collecting any liquid that may still be in the container.

Figure 2:
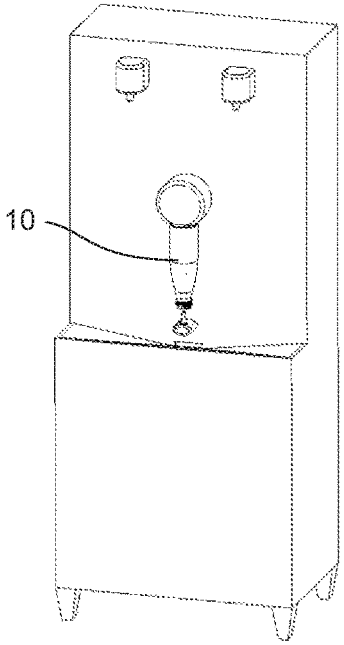
FIG. 2 shows a representation of the apparatus from FIG. 1 in a further treatment position.
Figure 3:
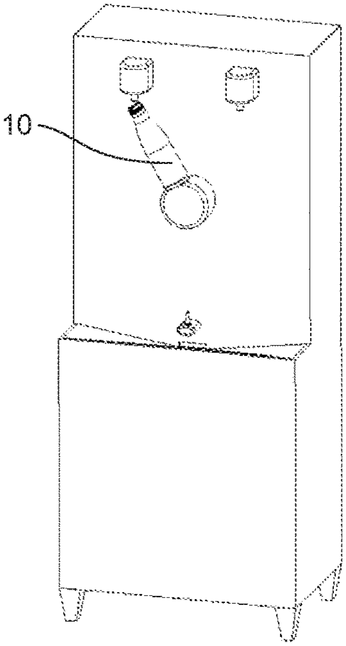
FIG. 3 shows a representation of the apparatus from FIG. 1 in a further treatment position.

FIG. 2 shows a representation of an apparatus according to the invention in a rinsing position. Here the container is deflected vertically downwards with the container mouth facing downwards. In this position, rinsing of the interior of the container is possible. FIG. 3 shows a further illustration in which the container is in a filling position, i.e. the container mouth is arranged below the first filling device 4.

Figure 4:
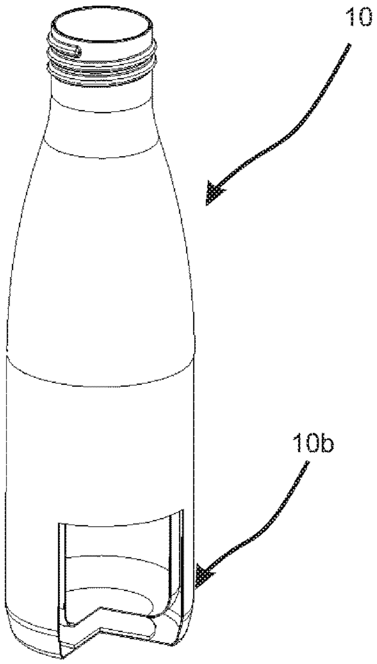
FIG. 4 shows a representation of a container for an apparatus according to the invention.
Figure 5:
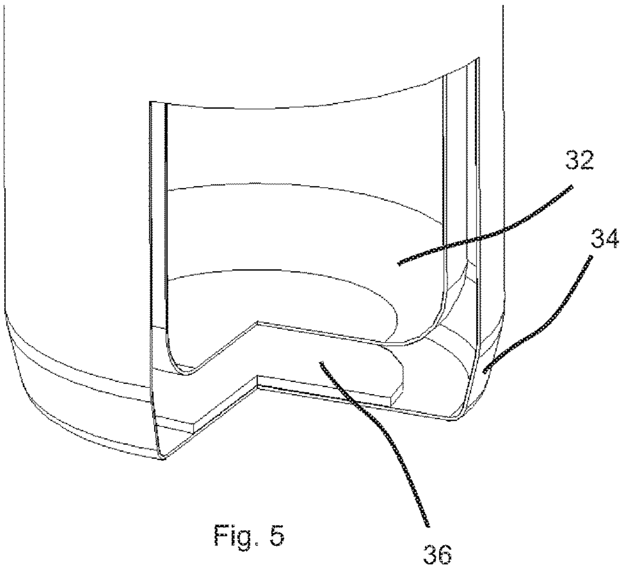
FIG. 5 shows a detailed representation of the container shown in FIG. 4.

FIG. 4 shows an illustration of a container with a bottom portion 10*b*. In the representation shown in FIG. 5, it can be seen that the container as a whole comprises an outer container 34 and an inner container 32. A ferromagnetic element 36, such as an iron plate/steel plate, may be disposed between these two containers 32 and 34. By means of this iron plate, the container can be temporarily fixed to the carrier shown in FIG. 1.

However, it would also be possible for the container to be attached to the carrier in another way, for example, it could be sucked in via suction devices both at its bottom and at its circumferential wall. In addition, it would be possible for the container to be placed in a ring or ring-segment-like structure, which is then at least slightly advanced onto the container. Such a holding ring could also have elastic means to hold the container securely. It should be noted that such a holding ring only needs to hold the weight of the container, as this is supported by the carrier itself during the actual filling process.

Figure 6:
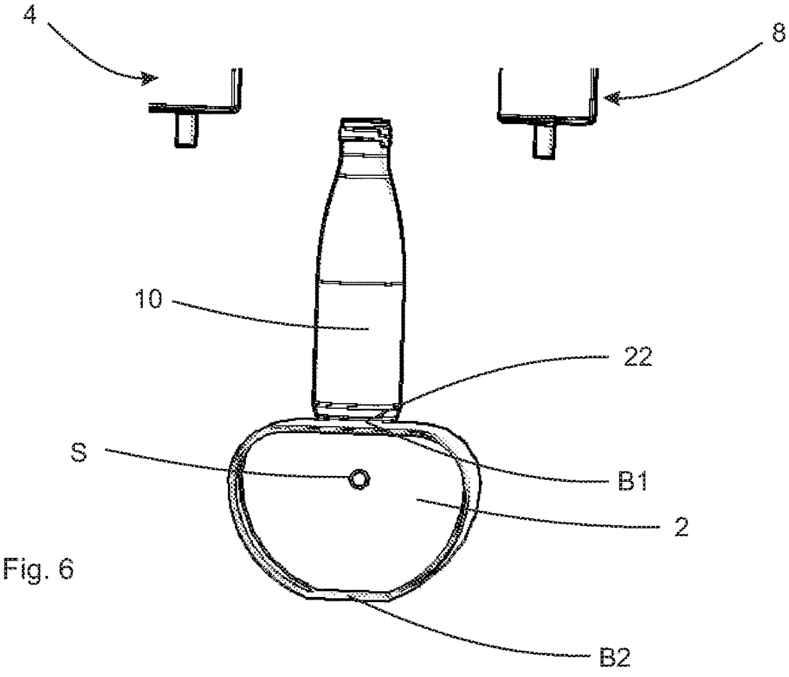
FIG. 6 shows a further illustration of an apparatus for filling containers in a further embodiment.

FIG. 6 shows a further embodiment of an apparatus for filling containers 10. Here, the carrier 2 has a first arrangement area B1 and a second arrangement area B2, at each of which the container 10 can be arranged. Preferably, the two arrangement areas B1, B2 also each have fixing means for fixing the container 10.

The two arrangement areas are at a different distance from the pivot axis S. Therefore, for example, a higher container can be placed on the arrangement area B1 and a less high container on the arrangement area B2. It would also be possible for the filling device 4 and/or the filling device 8 to be adjustable in the vertical direction or in the longitudinal direction of the container in order to enable adaptation to containers of different heights.

In addition, it would also be possible for the carrier 2 to have three or more arrangement areas.

Furthermore, it is possible that the carrier 2 has at least one arrangement area B1 or B2 and additionally the filling device 4 and/or the filling device 8 are adjustable in the vertical direction, respectively in the longitudinal direction of the container. Thus, at least two containers of different heights can be treated with at least one arrangement area B1 or B2.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS

1 apparatus
2 carrier
4 first filling device
6 rinsing device
8 second filling device
10 container
10*a* mouth
10*b* bottom area
12 collecting container
20 housing
32 inner container
34 outer container
36 ferromagnetic element
42 filling valve
62 rinsing valve or rinsing lance
S pivot axis
B1 first arrangement area
B2 second arrangement area

The invention claimed is:

1. An apparatus for filling containers comprising: a carrier on which a container to be filled can be placed and fixed, wherein the carrier is pivotable with respect to a pivot axis which extends at an angle different from 0° with respect to a longitudinal direction of the container to be filled; a first filling device positioned above the container to fill the container in a first pivot position of the container with respect to the pivot axis, wherein the container is fillable via a mouth of the container; and a rinsing device positioned to rinse the container through its mouth in a second pivot position of the container with respect to the pivot axis, the second pivot position being different from the first pivot position, wherein in the second position, the container is positioned above at least a rinsing nozzle of the rinsing device, and the mouth of the container projects downward toward the rinsing nozzle, wherein the container is rinseable through the mouth of the container while in the second pivot position.

2. The apparatus according to claim 1, wherein the pivot axis is perpendicular to the longitudinal direction of the container.

3. The apparatus according to claim 1, wherein a fixing device for fixing the container to the carrier is arranged on the carrier.

4. The apparatus according to claim 3, wherein the fixing device comprises a fixing device selected from the group consisting of a vacuum fixing device, a magnetic fixing device, gripping elements, mechanical elements, and combinations thereof.

5. The apparatus according to claim 1, wherein the container comprises a second fixing device for fixing the container to the carrier.

6. The apparatus according to claim 1, wherein the first filling device is arranged in such a way that the container is filled by this first filling device in a pivot position which deviates from a vertical orientation of the container.

7. The apparatus according to claim 1, wherein the rinsing device is arranged in such a way that the container can be rinsed by this rinsing device in a pivot position which deviates from a vertical orientation of the container.

8. The apparatus according to claim 1, wherein the apparatus comprises a second filling device for filling the container in a second pivoted position of the container with respect to the pivot axis via its mouth.

9. The apparatus according to claim 1, wherein the apparatus comprises an inspection device for inspecting the container.

10. The apparatus according to claim 1, wherein the carrier comprises a first arrangement area for arranging the container and a second arrangement area and the container can be selectively arranged at the first arrangement area or the second arrangement area.

11. The apparatus according to claim 1, wherein a filling speed at which the filling device fills the container is variable and/or adjustable.

12. A method for filling containers using the apparatus according to claim 1, comprising the steps of:

fixing a container to be filled to a carrier pivoting the carrier with the container fixed thereto into a rinsing position and rinsing the container through its mouth with a rinsing liquid pivoting the carrier with the container fixed thereto into a filling position and filling the container through its mouth with a liquid.

13. The method according to claim 12, wherein the container is inspected.

* * * * *